(12) United States Patent
Yong (10) Patent No.: US 11,435,875 B2
(45) Date of Patent: Sep. 6, 2022

(54) STATIC DYNAMIC ON SCREEN DISPLAY MENU

(71) Applicant: Dell Products L.P., Round Rock, TX (US)

(72) Inventor: Khang Chian Yong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/014,285

(22) Filed: Sep. 8, 2020

(65) Prior Publication Data
US 2022/0075488 A1  Mar. 10, 2022

(51) Int. Cl.
*G06F 3/0482* (2013.01)
*G06F 3/0488* (2022.01)
*G06F 3/02* (2006.01)

(52) U.S. Cl.
CPC .......... *G06F 3/0482* (2013.01); *G06F 3/0205* (2013.01); *G06F 3/0488* (2013.01)

(58) Field of Classification Search
CPC .. G06F 3/0482; G06F 3/02505; G06F 3/0205; G06F 3/0488; G06F 3/04886
See application file for complete search history.

(56) References Cited

U.S. PATENT DOCUMENTS

| | | | |
|---|---|---|---|
| 7,703,043 B2 * | 4/2010 | Utsuki | H04N 21/482 715/830 |
| 8,035,653 B2 | 10/2011 | Tsai | |
| 8,037,425 B2 * | 10/2011 | Lection | G06F 3/0482 715/853 |
| 9,521,352 B2 | 12/2016 | Ezequiel | |
| 9,529,501 B2 | 12/2016 | Hoerentrup et al. | |
| 2004/0233239 A1 * | 11/2004 | Lahdesmaki | G06F 3/0482 715/810 |
| 2005/0154988 A1 * | 7/2005 | Proehl | H04N 21/42206 715/720 |
| 2005/0210410 A1 * | 9/2005 | Ohwa | G06F 3/0482 715/821 |
| 2005/0257169 A1 * | 11/2005 | Tu | G06F 3/0481 715/810 |
| 2007/0061748 A1 * | 3/2007 | Hirose | H04N 5/44543 715/764 |
| 2007/0198949 A1 * | 8/2007 | Rummel | G06F 3/0482 715/810 |
| 2009/0201420 A1 | 8/2009 | Brown et al. | |

(Continued)

OTHER PUBLICATIONS

Morris, James, Samsung C24FG70 24in 144hz Curved Gaming Monitor Review, Jan. 27, 2017, Kitguru, pp. 1-14 (Year: 2017).*

*Primary Examiner* — Justin S Lee
(74) *Attorney, Agent, or Firm* — Zagorin Cave LLP; Robert W. Holland (57) ABSTRACT

A display, such as a computer monitor, presents a user interface having static and dynamic icons that define inputs made at a joystick input device. For example, a first static icon associates with a first input button to always command a menu presentation, and a second static icon associates with a second input button to always command an exit from the user interface. Plural dynamic icons associate with third and fourth input buttons that scroll the dynamic icons to populate a central input button of the joystick input device. A press at the central input button selects a function associated with the dynamic icon presented at the central input button.

20 Claims, 7 Drawing Sheets

(56) References Cited

U.S. PATENT DOCUMENTS

| | | | |
|---|---|---|---|
| 2010/0313166 A1* | 12/2010 | Nakayama | G06F 3/0482 715/810 |
| 2011/0010667 A1* | 1/2011 | Sakai | G11B 27/34 715/810 |
| 2011/0016391 A1* | 1/2011 | Borovsky | G06F 3/04883 715/702 |
| 2011/0131296 A1* | 6/2011 | Lee | G06F 3/0481 709/219 |
| 2011/0191516 A1* | 8/2011 | Xiong | G06F 3/041 710/305 |
| 2011/0197161 A1* | 8/2011 | Mattingly | G06F 3/04842 715/810 |
| 2013/0263052 A1* | 10/2013 | Fong | G06F 3/04883 715/825 |
| 2015/0378550 A1* | 12/2015 | Miyazaki | G06F 3/04886 715/784 |
| 2016/0196016 A1* | 7/2016 | Shim | G06F 3/04847 715/828 |
| 2016/0196035 A1* | 7/2016 | Lee | G06F 3/0346 715/810 |

* cited by examiner

STATIC DYNAMIC ON SCREEN DISPLAY MENU

BACKGROUND OF THE INVENTION

Field of the Invention

The present invention relates in general to the field of information handling system display menus, and more particularly to a static dynamic on screen display menu.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components in a housing to process information, such as a processor that executes instructions stored in a memory. Generally, one goal of information handling system processing is to present the results of processing as visual images at a display. Visual images are typically defined as pixel values that are communicated from the processor to the display and scanned across pixels of the display to define a color presented at each pixel. As an example, pixel values are communicated from a graphics processor of an information handling system through a cable having a standardized interface and to a timing controller of the display that scans the pixel values based upon the resolution of the display. Standardized cable interfaces for communication of pixel values include HDMI, DVI, DisplayPort and USB. Typically, the information handling system housing and display each include standardized cable ports to couple a cable for communicating with the pixel values. In some instances, a display integrates into an information handling system housing, such as is commonly found in portable information handling systems. In such systems, a standard cable is often used within the housing to interface the integrated display and processor.

One difficulty with presenting visual images at a display is that the display typically includes settings that can impact the quality of presented visual images, such as color, brightness, and contrast. In addition, the display often includes physical device controls, such as selection of an input source. For instance, a television may present visual images defined by an internal graphics processor or defined by an external device and communicated through a cable, such as from a set top box or optical disc player. The television display panel may present visual images based upon the selection of an input source from an internal source or from plural available external sources at each of plural ports. In some instances, display settings and physical device controls may be managed with commands provided from an interfaced information handling system, such as through a bi-directional control interface. However, an external display typically must also include an integrated capability to manage settings and physical devices through an integrated controller and on screen interface. For example, one common on screen interface has a centrally-located joystick button surrounded by four push buttons that each have a static input value. For instance, a top button opens a menu, a bottom button closes the menu and on screen interface, a press on the central joystick button enters a selection, and each of left and right buttons command a statically-defined menu, such as brightness and color. The on screen menu is presented at the display for control by touch inputs at a touchscreen sensor or at a peripheral device, such as a remote controller.

One difficulty with such conventional on screen interfaces is that the number of static defined inputs is limited by the number of push buttons around the joystick input button. Typically, a display will have a defined static function associated with each of the right and left push buttons, however, to interact with other functions the end user generally has to select a menu and navigate to the desired function. Generally, this limitation is enforced in part by the nature of conventional joystick input devices, which tend to have only the four input buttons surrounding the central joystick input button.

SUMMARY OF THE INVENTION

Therefore, a need has arisen for a system and method which presents a user interface having static and dynamic icons to manage functions performed at a device, such as a display.

In accordance with the present invention, a system and method are provided which substantially reduce the disadvantages and problems associated with previous methods and systems for interacting with a device through a user interface. A static dynamic user interface is presented with static icons each associated with a single static function and presented to accept inputs from defined input buttons of a joystick device, and with dynamic icons each associated with a dynamic function and presented to scroll across a central input button of the joystick device so that a user selects and launches the dynamic function by pressing the central input button.

More specifically, a display interfaces with an information handling system, such as a desktop, portable or set top box, to receive visual information, such as pixel values, for presentation as visual images at the display. A processor integrated in the display, such as a timing controller or scalar, interfaces with instructions stored in non-transitory memory, such as a flash memory, to generate a static dynamic interface for presentation at the display. The static dynamic user interface has a central input button surrounded by four input buttons arranged in a joystick configuration. The upper input button has a static menu icon that activates a menu function when pressed. The lower input button has a static exit icon that exits the user interface when pressed. The static icons do not change their association with their static functions. The left and right side input buttons manage scrolling of dynamic icons to select one of plural dynamic icons for presentation over the central input button so that a dynamic function associated with the selected dynamic icon is activated at a press of the central input button. The joystick configuration may be managed with touch inputs that the display, through a joystick integrated in the display, or through an external device, such as a television controller, mobile telephone and information handling system.

The present invention provides a number of important technical advantages. One example of an important technical advantage is that a display setting user interface efficiently presents plural dynamic icons in a joystick configuration for control by a joystick device. The end user scrolls through the dynamic icons with side input buttons and selects a dynamic function with a press of the central input button. This allows presentation of multiple dynamic functions that an end user can configure to provide a shortcut for common functions with a press of the center input button. The dynamic function selection is intuitive using the side joystick buttons for scrolling and the central input button for commanding the dynamic function, while the static icons provide an expected interaction in a known location at which the end user can readily enter a menu of functions to select or exit the interface.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A display that presents visual images of an information handling system includes a user interface to manage display settings with static and dynamic icons. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
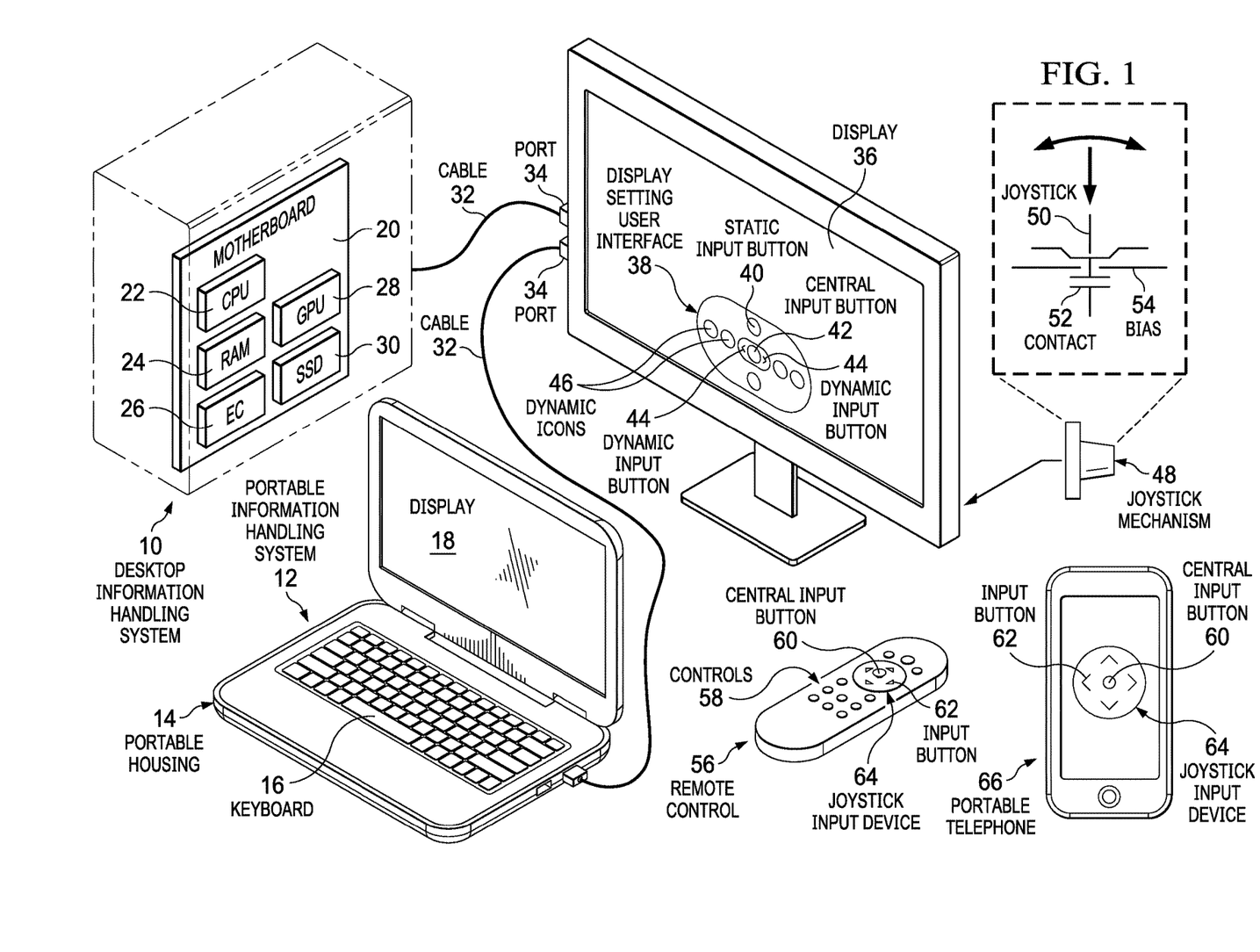
FIG. 1 depicts information handling systems interfaced with a display having a static dynamic on screen menu.

Referring now to FIG. 1, information handling systems interface with a display having a static dynamic on screen menu. In the example embodiment, a desktop information handling system 10 and a portable information handling system 12 interface with a peripheral display 36 through a cable 32 and ports 34, such as USB, DisplayPort, HDMI or other types of display cables and ports. Portable information handling system 10 is built in a portable housing 14 having an integrated keyboard 16 and integrated display 18. Although the static dynamic on screen menu is described with an implementation in peripheral display 36, in an alternative embodiment it may be implemented in the display 18 of portable information handling system 14. In the example embodiment, a motherboard 20 is depicted that may be integrated in either desktop information handling system 10 or portable information handling system 12 to process information. Motherboard 20 supports communication between processing components that cooperate to process information. For example, a central processing unit (CPU) 22 executes instructions to process information with the instructions and information stored in a random access memory (RAM) 24. An embedded controller 26 executes firmware instructions to manage operating conditions of the information handling system, such as application of power and interactions with input/output devices like keyboard 16. A graphics processor unit (GPU) 28 interfaces with CPU 22 to accept information for further processing, such as to generate pixel values that defines visual images at pixels of a display. A solid state drive (SSD) 30 or other non-transitory memory devices provides storage of information and instructions during power down states. For example, at application of power, embedded controller 26 executes boot instructions to retrieve an operating system and applications from SSD 30 to RAM 24 for execution by CPU 22. Generally, information is presented at peripheral display 36 based upon pixel values generated by a graphics processor and communicated through a cabled or wireless interface.

Display 36 presents a display setting user interface 38 that accepts display settings from a joystick input device. For example, an internal processing component, such as a timing controller or scalar, includes firmware instructions stored on a non-transient memory, such as a flash memory, that locally generates pixel values for presentation of display setting user interface 38. In one embodiment, display 36 includes a touchscreen that detects touches at display settings user interface 38 to accept inputs. Alternatively, various interfaces may be used to perform display setting inputs as described below. Display setting user interface 38 of the example embodiment includes upper and lower static input buttons 40, a central input button 42, first and second dynamic inputs buttons 44 and plural dynamic icons 46. In the example embodiment, the upper static input button 40 responds to a press by an end user by commanding a static function, such as presentation of a menu that the end user can navigate to reach all available display settings. The lower static input button 40 responds to a press by an end user by commanding an exit from the display setting user interface 38. In various alternative embodiments, other static functions may be assigned to static input buttons 40. Dynamic input buttons 44 are disposed on both sides of a central input button 42 to control scrolling of dynamic icons 46 over central input button 42. Each dynamic icon 46 commands an associated function so that end user selection of the dynamic function is performed by moving the desired dynamic icon 46 over central input button 42 and pressing on central input button 42. In the example embodiment, five dynamic functions may be selected in association with each of five dynamic icons 46. In alternative embodiments, different numbers may be used in a configurable manner by the end user that provides shortcuts for the end user to achieve selections otherwise made with inputs to the static input button 40 for selection of the menu and manual interactions with the menu to select the desired function.

In addition to inputs made through a touchscreen of display 36, a variety of other joystick input devices may be used to interact with display setting user interface 38. In one example embodiment, a mechanical joystick mechanism 48 integrates in display 36 to accept end user selections at a joystick 50 having a contact 52 to detect presses and movements with joystick 50 biased to a neutral position by a biasing mechanism 54, such as an arrangement of springs. For example, a press down on joystick 50 in the neutral position commands an input of the dynamic function associated with the dynamic icon 46 presented at central input button 42. An upward press on joystick 50 commands the static function of the upper static input button 40, such as presentation of the menu. A downward press on joystick 50 commands the static function of the lower static input button 40, such as exit from display setting user interface 38. A right press on joystick 50 scrolls dynamic icons 46 to the right to change the dynamic icon displayed over central input button 42 and a left press on joystick 50 scrolls dynamic icons 46 to the left to change the displayed dynamic icon in the opposite direction. Once an end user has the dynamic icon 46 with a desired associated function presented over central input button 42, a press on central input button 42 commands that dynamic function.

A similar interaction with display setting user interface 38 may be performed with external controllers having a wireless communication, such as an infrared or Bluetooth interface with display 36. For example, a television remote controller 56 includes television controls 58, such as volume and channel selection controls, and a joystick input device 64 having a central input button 60 surrounded by four input buttons 62. Joystick input device 64 provides similar functionality to joystick mechanism 48 with a push of the central input button 60 commanding the function associated with the dynamic icon 46 presented on the central input button 42 of display setting user interface 38 and presses at input buttons 62 corresponding to the positions of joystick 50 for up, down, right and left inputs. A portable telephone information handling system 66 presents a joystick input device 64 at an integrated touchscreen display and provides inputs to display 36 with touches at the touchscreen interpreted similarly to touches at the joystick input buttons of television remote control 56. In one alternative embodiment, portable telephone information handling system 66 may present dynamic icons 46 in a synchronized manner with display 36. The presentation of dynamic icons 46 may be based upon communication of the dynamic icons from display 36 or may be generated at portable telephone information handling system 66 for communication to display 36 so that portable telephone information handling system 66 controls which dynamic icons are presented at display 36. In another alternative embodiment, portable information handling system 12 may present a joystick input device to control both display 18 and/or display 36, such as with an application managed by the operating system or firmware executing on GPU 28 or embedded controller 26. Desktop information handling system 10 may support direct interactions on display 36, such as through a mouse that communicates through cable 32. In one example embodiment, desktop information handling system 10 may be a set top box that communicates with television remote controller 56 to manage interactions with display setting user interface 38.

Figure 2:
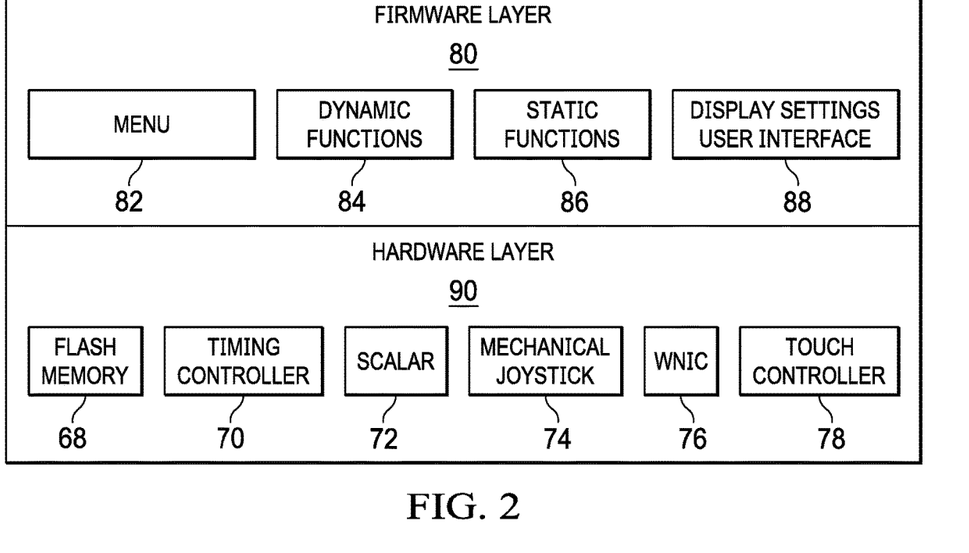
FIG. 2 depicts a block diagram of a display hardware and firmware layer to manage interactions between the display setting user interface and an end user.

Referring now to FIG. 2, a block diagram depicts a display hardware layer 80 and firmware layer 90 to manage interactions between the display setting user interface and an end user. Hardware layer 80 includes a flash memory 68 to provide non-transient memory that stores instructions for execution by a timing controller 70 and/or a scalar 72. Timing controller 70 receives pixel values from an information handling system and scans the pixel values to pixels of the display to generate a visual image. Scalar 72 provides processing to scale visual images to a resolution supported by the display, such as high definition or ultrahigh definition. A mechanical joystick 74 integrates in the display to accept end user inputs. In various embodiments, other types of input devices may be included to provide physical inputs to the display. A touch controller 78 interfaces with a touch detection sensor of the display, such as a capacitive touch sensor, to detect and resolve touch inputs. A wireless network interface card (WNIC) 76 provides communication with external devices, such as through infrared or Bluetooth wireless signals. In addition, WNIC 76 may include wired interfaces for communicating through wired interfaces, such as DisplayPort or USB.

Firmware layer 90 includes firmware modules that execute on a processor, such as timing controller 70 or scalar 72, and are stored in non-transitory memory, such as flash memory 68. A menu module includes a menu of functions that are performed by the processor, such as through a logical surfing by mechanical joystick 74 or an external controller communicating through WNIC 76. A dynamic function module 84 stores dynamic functions that execute on the processor, each dynamic function having a dynamic icon associated with it to command the dynamic function as a shortcut outside the menu module 82. A static functions module 86 stores static functions that execute on the processor, each static function having a static icon associated with it to command the static function as a shortcut outside the menu module 82. A display user interface module 88 generates the display user interface for presentation at the display, including manipulation of the location presentation of the dynamic icons as described in greater detail below.

Figure 3:
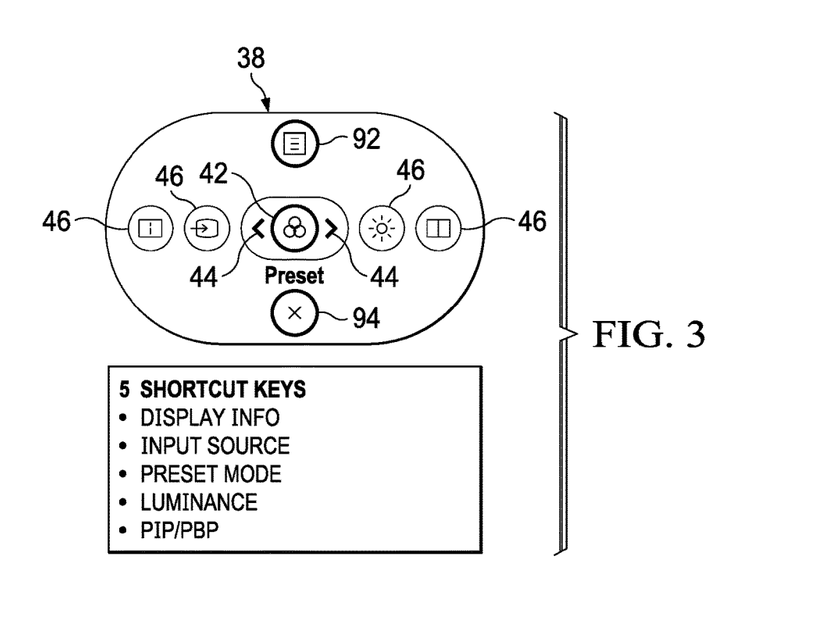
FIG. 3 depicts an example of a static dynamic on screen menu for use as a display setting user interface.

Referring now to FIG. 3, an example of a static dynamic on screen menu is depicted for use as a display setting user interface 38. In the example embodiment, an upper static icon 92 is presented at the upper static input button to accept inputs that command presentation of a menu. A lower static icon 94 is presented at the lower static input button to command an exit from the on screen menu. Five dynamic icons 46 are presented in a linear arrangement with the center dynamic icon 46 presented over the central input button 42 between left and right input buttons 44 that are depicted as arrows. In the example embodiment, the five dynamic functions presented on the dynamic icons 46 include a display info function, an input source function, a preset mode function, a brightness/contrast function and a picture-in-picture (PIP/PBP) function. In alternative embodiments, greater than five dynamic icons 46 may be presented or a greater number of dynamic functions may be scrolled through by hiding extra functions outside of the five depicted and bringing the hidden dynamic functions into view as right and left input buttons 44 are activated.

Figure 4:
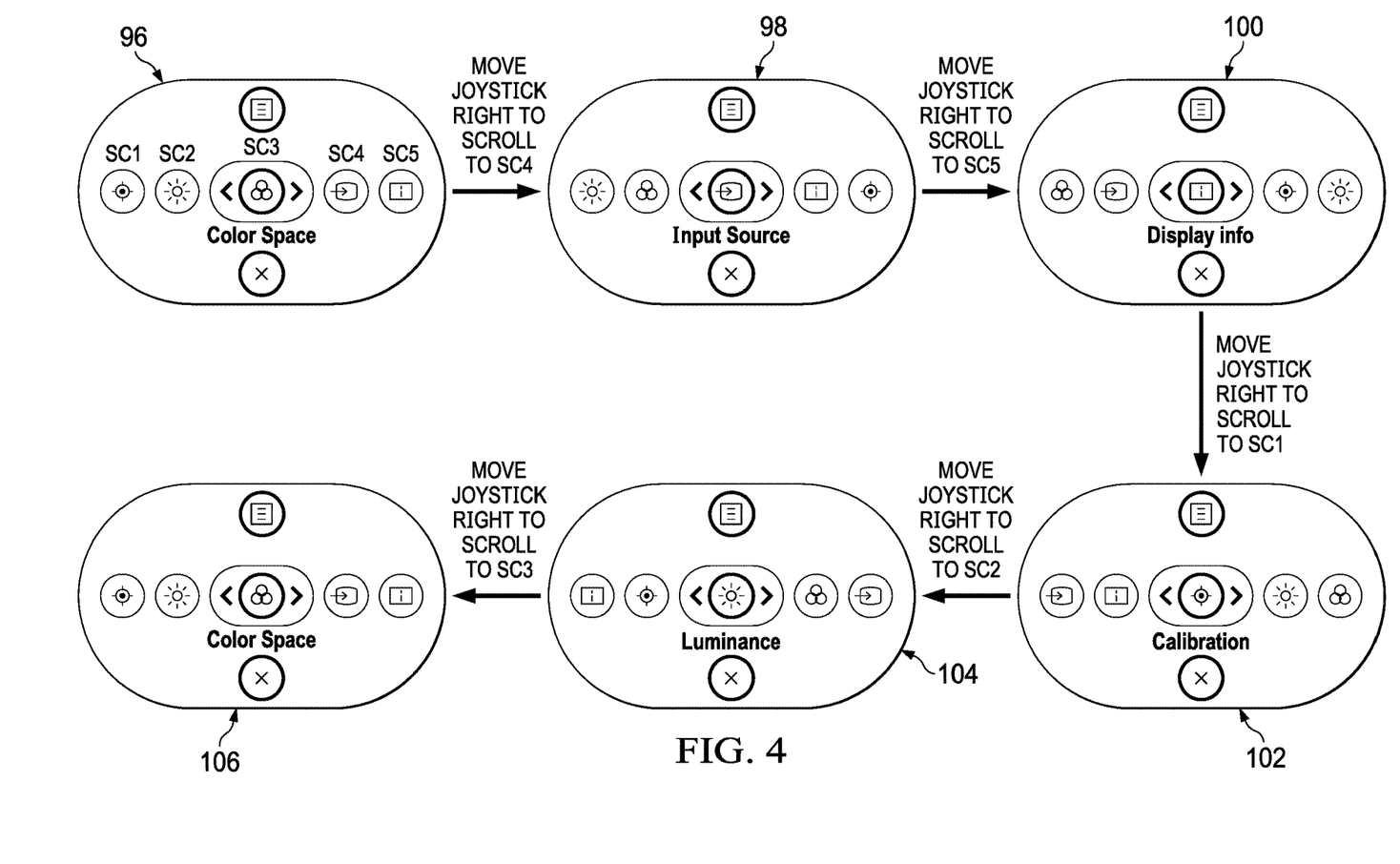
FIG. 4 depicts a flow diagram of a process for wrap around presentation of dynamic icons at a display setting user interface.

Referring now to FIG. 4, a flow diagram depicts a process for wrap around presentation of dynamic icons at a display setting user interface 38. At step 96, the display setting user interface opens to either a default presentation or the last displayed presentation. Each dynamic icon is presented with an image that represents the function commanded by that dynamic icon in the event that the dynamic icon is presented in a central position and pressed. A joystick input device press on the right arrow proceeds the process to step 98 by scrolling the dynamic icons one position to the right with the left most dynamic icon wrapping around to the far right position. Another press on the right arrow proceeds the process to step 100 having the far left dynamic icon wrapping around to the right side. At each of steps 102, 104 and 106, scrolling of the dynamic icons continue with an incremental movement for each input of a scroll of all dynamic icons and a wrap around of the far left icon to the right side. A push on the left input button arrow provides a scroll of the dynamic icons in the opposite direction with a similar wrap around. In one example embodiment, only three dynamic icons are presented with the two outer dynamic functions hidden from view when wrapped around and coming into view at a next input command to scroll. This allows the display setting user interface to more efficiently use display space. In addition, a user configurable number of dynamic icons may be presented of from three to greater than five. An end user can, for instance, define functions in the menu to be presented as dynamic icons to allow a more rapid shortcut for selection of desired functions.

Figure 5:
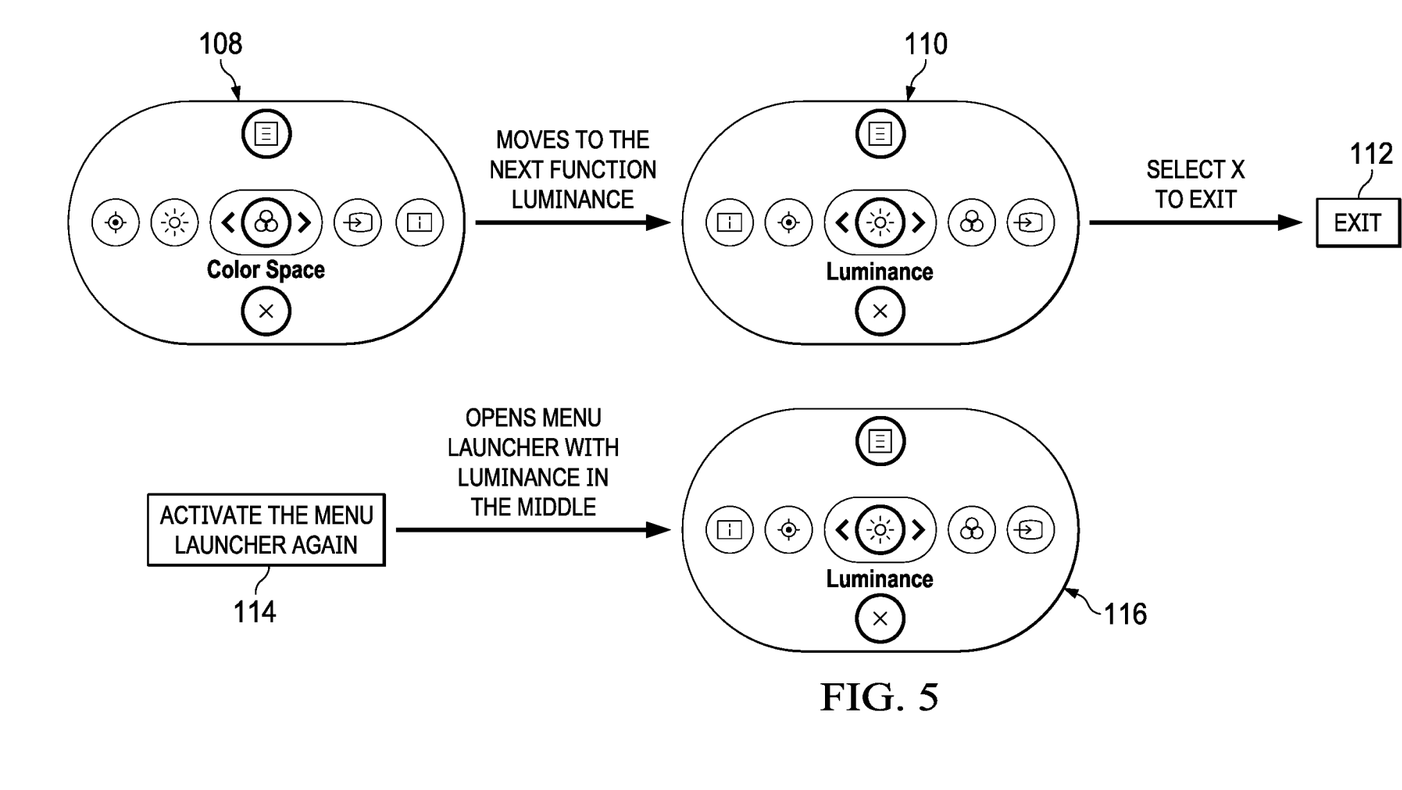
FIG. 5 depicts a flow diagram of a process for selection of a dynamic icon for presentation at a display setting user interface.

Referring now to FIG. 5, a flow diagram depicts a process for selection of a dynamic icon for presentation at a display setting user interface. At step 108 an end user opens the display setting user interface to present a default configuration of dynamic icons. At step 110, the end user interacts with the input buttons to move the brightness contrast dynamic icon over the central input button. At step 112, the user selects the static exit function to close the display setting user interface and the user interface closes. Upon closure, the brightness contrast dynamic icon is saved as the last selected by the end user. At step 116, an end user opens the display settings user interface. In response, at step 114 the last dynamic icon configuration is retrieved and applied for presentation at the display settings user interface, such as the brightness contrast dynamic icon selected at step 110.

Figure 6:
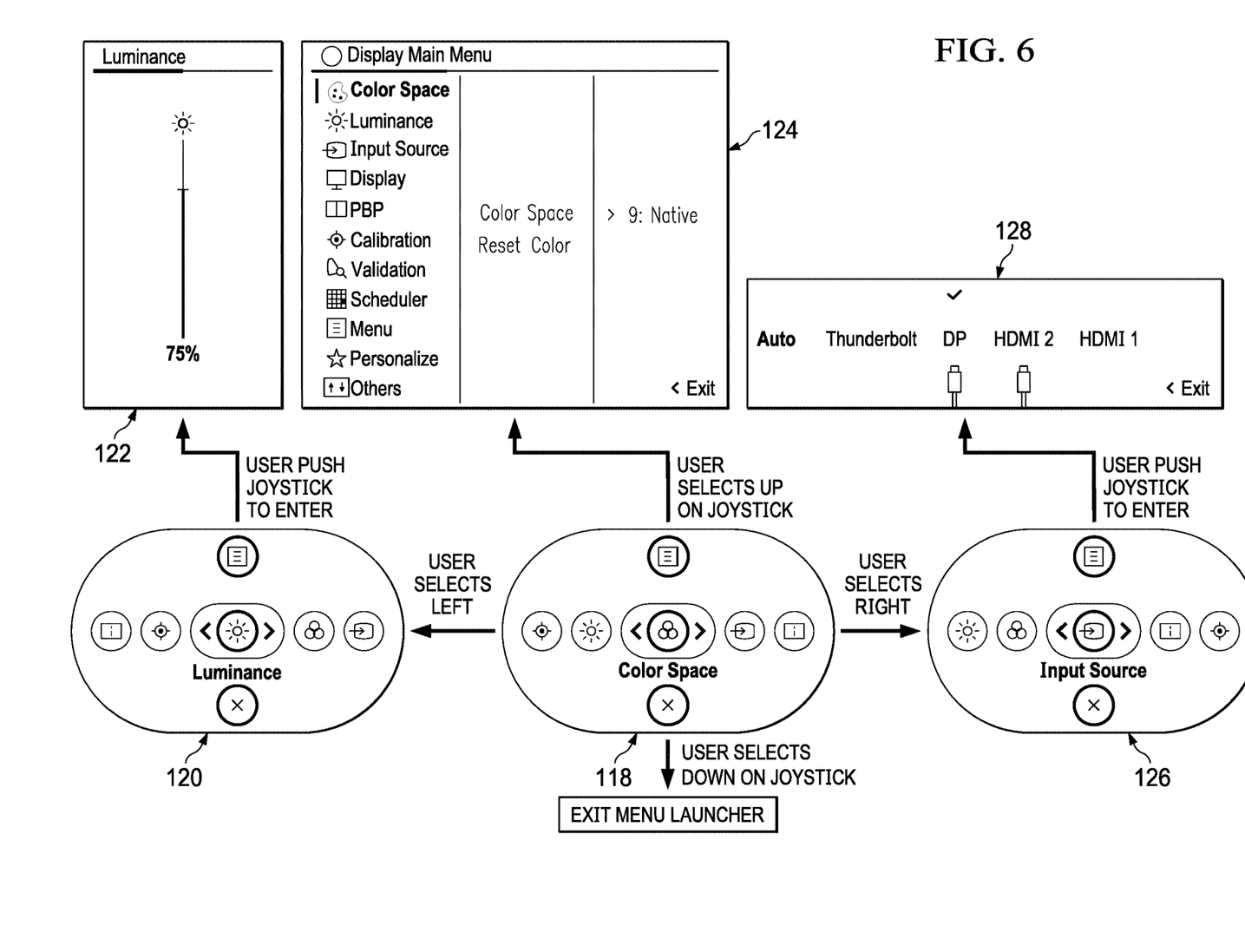
FIG. 6 depicts a flow diagram of a process for interactions with static and dynamic icons at a display setting user interface.

Referring now to FIG. 6, a flow diagram depicts a process for interactions with static and dynamic icons at a display settings user interface. The process starts at step 118 with initiation of the display setting user interface. At step 120, an end user input over the arrow input button places the brightness/contrast dynamic icon over the central input button. At step 122, the end user presses on the central input button to initiate presentation of a functional presentation for interactions with brightness/contrast controls. With the brightness/contrast dynamic icon presented at the central input button, pressing the central input button provides a shortcut to command the brightness/contrast user interface. At step 118, a press of the lower static input button commands an exit from the display settings user interface. At step 124, a press of the upper static input button commands a presentation of the display menu. From the display menu, the end user can select any function by surfing through the menu selections. The upper and lower static input buttons have a static function tied to each that remains unchanged so that an end user can select the menu and exit the display setting user interface by always having the static icon functions available. At step 126, the end user input over the arrow input button places the source selection dynamic icon over the central input button. Upon pressing the central input button, the process continues to step 128 to present the source selection menu at which the end user can select a port for sourcing of visual information. As described above, an end user can reach both the brightness/contrast function and the source selection function by selecting the static menu input button and surfing through the menu at step 124 to either the brightness/contrast menu at step 122 or the source menu at step 128.

Figure 7:
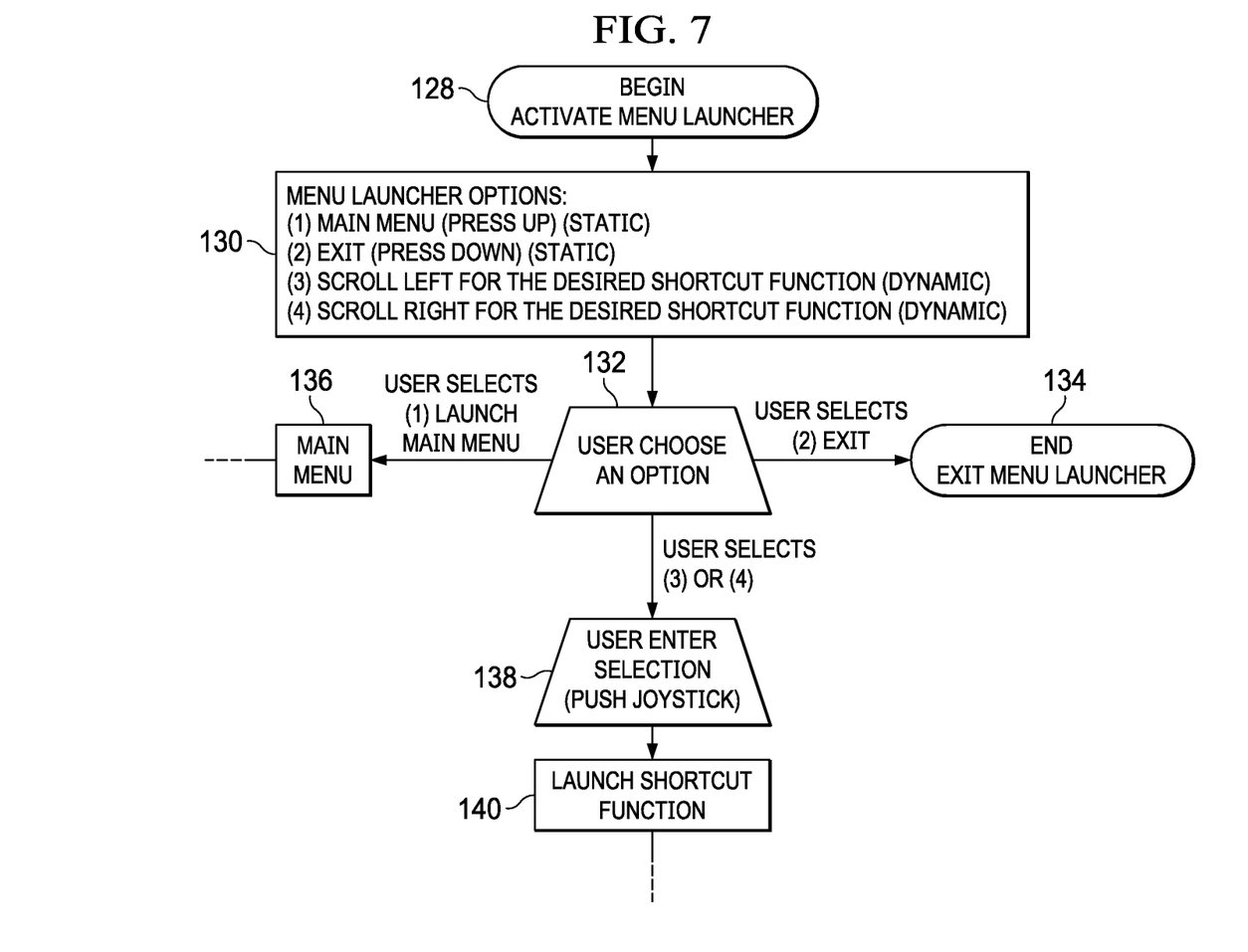
FIG. 7 depicts a flow diagram of a process for managing end user inputs with a static dynamic user interface.

Referring now to FIG. 7, a flow diagram depicts a process for managing end user inputs with a static dynamic user interface. The process begins at step 128 with an initiation of a menu launcher that activates the display settings user interface. At step 130, the display settings user interface is presented with a menu static icon at a press up on the joystick to command a menu, an exit static icon at a press down on the joystick to command exit, and plural dynamic icons each associated with a dynamic function and selected with left or right presses on the joystick to present the desired dynamic icon over a central input button. At step 132, the end user selects an option through the display settings user interface. If the user selects a down press with the joystick, the process continues to step 134 to command exit from the display settings user interface. If the user selects an up press with the joystick, the process continues to step 136 to command presentation of the main menu. If the user selects a left or right input, the process continues to step 138 to adjust the dynamic icon at the center input button. Upon selection of the center input button, the process continues to step 140 to launch the function associated with the dynamic icon presented over the center input button. Although the example embodiment addresses a display setting user interface, in alternative embodiments, alternative types of devices may be controlled with the described static dynamic user interface.

Figure 8:
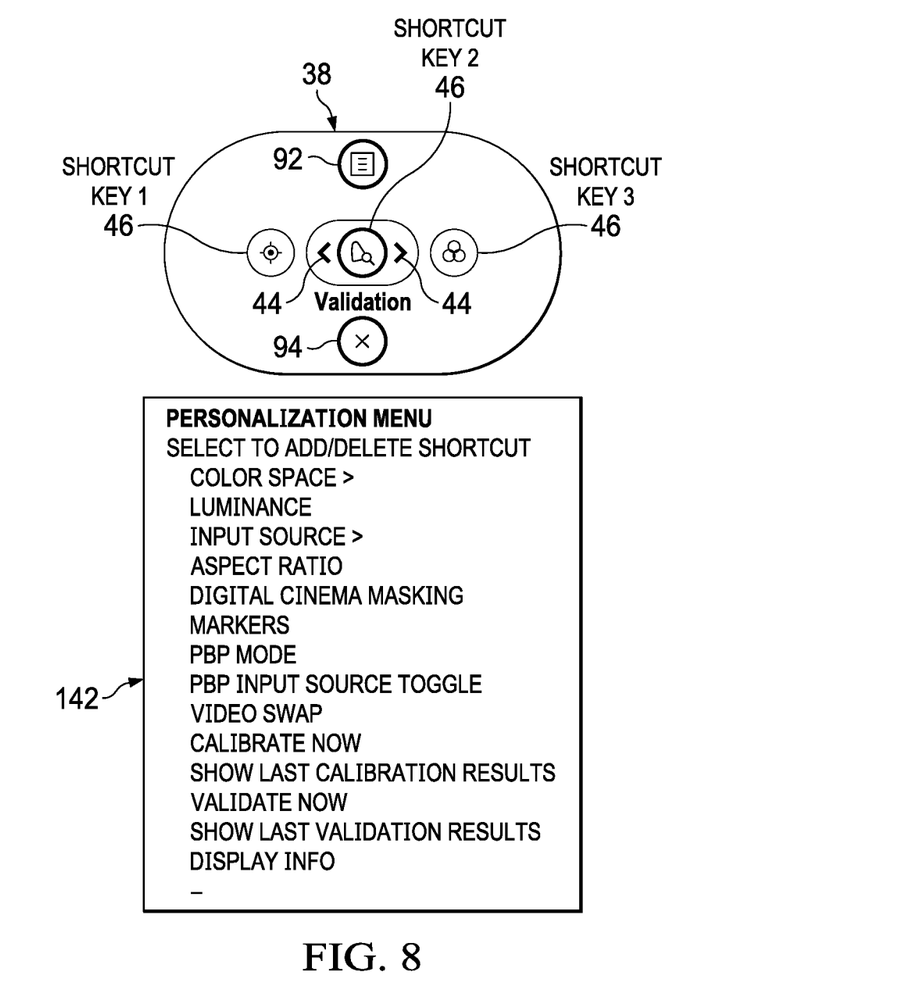
FIG. 8 depicts a menu that provides modification of dynamic icons presented at the display settings user interface.

Referring now to FIG. 8, a menu 142 is depicted that provides modification of dynamic icons 46 presented at the display settings user interface 38. For example, an end user selects the static upper input button 92 to present the menu and from the menu selects a personalization option to present the depicted personalization menu 142. From personalization menu 142, the end user is provided with a list of available shortcuts that the end user can select to create or remove a dynamic icon 46. For example, with the three dynamic icons 46 presented, selection of one of those shortcuts from personalization menu 142 will remove that dynamic icon from presentation. If a selection of a shortcut from personalization menu 142 does not match a presented dynamic icon presented at display setting user interface 38, a dynamic icon is added that matches the selected shortcut. As described above, an end user may select more than five shortcuts for presentation as dynamic icons and scroll through the dynamic icons 46 with side input buttons 44 with the dynamic icons coming into and out of view. Alternatively, greater than five dynamic icons may be presented where sufficient screen area is available to present display settings user interface 38. Once the end user interaction is complete, a press on the static exit icon 94 closes the display setting user interface 38.

Although the present invention has been described in detail, it should be understood that various changes, substitutions and alterations can be made hereto without departing from the spirit and scope of the invention as defined by the appended claims.

What is claimed is:

1. An information handling system display comprising:
a processor operable to execute instructions to process information;
a memory interfaced with the processor and operable to store the instructions and information;
a display interfaced with the processor and operable to present the information as visual images;
a non-transitory memory storing interface instructions that when executed on the processor generate a user interface for presentation at the display, the user interface having a central input icon, an upper static icon, a lower static icon and plural dynamic icons disposed at opposing sides of the central input icon, each of the plural dynamic icons and the central input icon operable to dynamically change a depicted of plural dynamic functions; and
a joystick input device having a central input button disposed within a perimeter of four input buttons, the four input buttons including an upper input button that presses to select a first static function of the upper static icon, a lower input button that presses to select a second static function of the lower static icon, and right and left side buttons, the plural dynamic icons sliding right and left respectively across the central input icon in response to presses of the right and left side buttons to select one of the plural dynamic functions for presentation at the central input icon, wherein pressing of the central input button selects a first dynamic function associated with the one of the plural dynamic icons presented at the central input icon and at least a first and a second of the plural dynamic icons are presented adjacent to and at opposing sides of the right and left side buttons.

2. The information handling system display of claim 1 further comprising:
a controller disposed in the display and operable to act as the processing element that executes the interface instructions;
wherein the plural dynamic functions include at least display brightness and display input source.

3. The information handling system display of claim 1 wherein the first static function comprises a selection to present a menu at the display and the second static function comprises a selection to exit presentation of the user interface.

4. The information handling system of claim 1 wherein the joystick input device comprises a television remote control device operable to control the display through wireless commands including at least change of a television channel.

5. The information handling system display of claim 1 wherein the joystick input device comprises the central push button integrated in the display and pivoting at a central axis to activate the upper, lower, right and left push buttons.

6. The information handling system display of claim 1 wherein joystick input device comprises an image presented on a portable information handling system wirelessly interfaced with the display.

7. The information handling system display of claim 1 wherein the plural dynamic icons wrap around in presentation in response to right and left push button inputs.

8. The information handling system display of claim 7 wherein the instructions are further operable to store the dynamic icon presented at the central input icon at closure of the user interface and retrieve the stored dynamic icon at the next opening of the user interface.

9. The information handling system display of claim 7 wherein the processing element comprises the processor.

10. A method for managing a display through an on screen menu, the method comprising:
initiating the on screen menu to present at the display a joystick interface having a central input button surrounded by four input buttons;
selecting an upper of the four input buttons to command presentation of a menu;
selecting a lower of the four input buttons to command exit from the on screen menu;
selecting a right side of the four input buttons to scroll plural dynamic function icons to the right, each of the plural dynamic function icons presented over the central input button in sequential order, at least one of the plural dynamic function icons presented adjacent to and to the right of the right side input button, at least one of the plural dynamic function icons presented adjacent to and to the left of the left side input button, and at least one of the plural dynamic function icons presented over the central input button;
selecting a left side of the four input buttons to scroll the plural dynamic function icons to the left, each of the plural dynamic function icons presented over the central input button in sequential order; and
activating the central input button to select a dynamic function associated with the dynamic function icon presented over the central input button at the time of the activating.

11. The method of claim 10 further comprising:
integrating a touchscreen in the display; and
detecting selections at the central input button and four input buttons as touches at the touchscreen.

12. The method of claim 10 further comprising:
integrating a mechanical joystick in the display aligned to a vertical axis;
detecting the activating the central input button with a press downward on the mechanical joystick; and
detecting selecting the four input buttons with a lateral press to misalign the mechanical joystick from the vertical axis.

13. The method of claim 10 further comprising:
interfacing an external controller with the television through wireless communication, the external controller having a joystick input device; and
communicating selections from the joystick input device to the television through the wireless communication.

14. The method of claim 13 wherein the external controller comprises a television controller having input buttons that include at least selection of a television channel for presentation at the display.

15. The method of claim 13 wherein the external controller comprises a portable information handling system telephone having a joystick input device presented at an integrated touchscreen.

16. An on screen menu comprising:
a non-transitory memory operable to store instructions; and
instructions stored in the non-transitory memory operable to execute on a processor to:

present a user interface at a display, the user interface having a central input button surrounded by four input buttons;

present first and second static function icons at first and second of the four input buttons, the first input button above the central input button, the second input button below the central input button;

present three or more dynamic function icons in association with third and fourth of the four input buttons, at least one of the dynamic function icons presented at a first position adjacent to and to a left side of the third input button and central input button, at least another of the dynamic function icons presented at a second position adjacent to and to a right side of the fourth input button and central input button, and at least one of the dynamic function icons presented over the central input button;

respond to inputs at the third input buttons by scrolling left through the plural dynamic icons for presentation at the central input buttons;

respond to inputs at the fourth input button by scrolling right through the plural dynamic icons for presentation at the central input button; and respond to a press at the central input button by commanding a function associated with a one of the plural dynamic icons presented at the central input button at the press.

17. The on screen menu of claim 16 wherein the instructions:
responds to a press of the first button by presenting a menu; and
responds to a press of the second button by exiting the user interface.

18. The on screen menu of claim 17 wherein the instructions receive inputs from an input device external to the display and having a joystick input device with a central input button surrounded by four input buttons.

19. The on screen menu of claim 17 wherein the instructions:
store the one of the plural dynamic icons presented at the central input button upon exiting of the user interface; and
retrieves the stored one of the plural dynamic icons for presentation at the next initiation of the user interface.

20. The on screen menu of claim 19 wherein the stored one of the plural dynamic icons is associated with a function for selection of an input source to the display from plural input source ports.

* * * * *